United States Patent [19]

Presby

[11] Patent Number: 5,076,654
[45] Date of Patent: Dec. 31, 1991

[54] PACKAGING OF SILICON OPTICAL COMPONENTS

[75] Inventor: Herman M. Presby, Highland Park, N.J.

[73] Assignee: AT&T Bell Laboratories, Murray Hill, N.J.

[21] Appl. No.: 603,646

[22] Filed: Oct. 29, 1990

[51] Int. Cl.$^5$ .............................................. G02B 6/12
[52] U.S. Cl. ...................................... 385/129; 385/14
[58] Field of Search ................ 350/96.11, 96.12, 96.15

[56] References Cited

U.S. PATENT DOCUMENTS

| | | | |
|---|---|---|---|
| 4,361,643 | 11/1982 | Banks et al. | 430/396 |
| 4,610,502 | 9/1986 | Nicia et al. | 350/96.12 |
| 4,639,074 | 1/1987 | Murphy | 350/96.15 |
| 4,877,301 | 10/1989 | Yokomori et al. | 350/96.19 |
| 4,878,727 | 11/1989 | Boiarski et al. | 350/96.11 |
| 4,883,743 | 11/1989 | Booth et al. | 350/96.12 |
| 4,889,401 | 12/1989 | Klement et al. | 350/96.12 |
| 4,896,930 | 1/1990 | Tsuchitani et al. | 350/96.12 |
| 4,904,042 | 2/1990 | Dragone | 350/96.16 |

OTHER PUBLICATIONS

F. S. Hickernell, "Optical Waveguides, on Silicon", Solid State Technology, Nov. 1988, pp. 83-88.
C. H. Henry et al., "Glass Waveguides on Silicon for Hybrid Optical Packaging", Journal of Lightwave Technology, vol. 7, No. 10, Oct. 1989, pp. 1530-1539.
B. H. Verbeek et al., "Integrated Four-Channel Mach-Zehnder. . . ", Journal of Lightwave Technology, vol. 6, No. 6, Jun. 1988, pp. 1011-1015.
C. H. Henry et al., "Compound Bragg Reflection Filters, et al.", Journal of Lightwave Technology, vol. 7, No. 9, Sep. 1989, pp. 1379-1385.

*Primary Examiner*—John D. Lee
*Assistant Examiner*—Stephen W. Barns
*Attorney, Agent, or Firm*—Oleg E. Alber

[57] ABSTRACT

This invention is a new optical packaging and interconnection technology which is particularly effective in not only addressing the problem of attaching fiber pigtails to glass waveguide silicon devices, but also in isolating these waveguide devices from the deleterious effects of their external environment. An important aspect of the invention lies in the novel realization that the foregoing objectives may be achieved by covering the device with a thin silica coverplate affixed with a low index epoxy, which act as an extended cladding layer for optically confining the optical radiation below the coverplate.

12 Claims, 5 Drawing Sheets

PACKAGING OF SILICON OPTICAL COMPONENTS

TECHNICAL FIELD

The present invention relates to integrated optical components and, more particularly, to optical components fabricated on silicon substrates.

BACKGROUND OF THE INVENTION

Recently, a new technology for fabricating integrated optical components has been developed by depositing doped-silica waveguides on silicon substrates by such techniques as chemical or plasma etching, ion milling, sputter etching, and chemically assisted ion milling. See for example, J. T. Boyd et al., *Optical Engineering*, Vol. 24, No. 2, pp. 230-4 (1985) and F. S. Hickernell, and *Solid State Technology*, Vol. 31, No. 11, pp. 83-8 (1988). Advantageously, this technology affords the potential to make optical devices that are compact, of greater complexity, and lower in cost than those devices fabricated from fiber or microoptics components.

In the prior art, various passive optical components have been made using the above silica on silicon technology in which optical waveguides are deposited on a base layer called a "hipox" formed by the oxidation of silicon under high pressure steam. Typically, anisotropic etching is utilized to define the core structure comprising, for example, phosphosilicate glass or P-doped silica. Further, with a thin cladding layer of silica ($SiO_2$) covering the core, low loss channel waveguides are readily fabricated on silicon, which then may be configured to produce many useful integrated optical devices for communications and signal processing, such as Bragg reflectors, four channel multiplexers, polarization splitters and array star couplers. See, for example, C. H. Henry et al., *Journal of Lightwave Technology*, Vol. 7, 1379-85 (1989), Y. Shani et al. *Appl. Phys. Lett.*, Vol. 56 pp. 120-1 (1990), and U.S. Pat. No. 4,904,042.

While these devices exhibit excellent performance, many of the components therein, namely the waveguides, are highly sensitive to the environment due to the relatively thin silica or $SiO_2$ cladding layer. The coating, that is the cladding layer, which is about 4 $\mu$m thick does not provide sufficient optical confinement for the evanescent field radially extending from core, thereby allowing it to deleteriously interact with the environment. For example, touching the upper surface of the component dramatically changes the device performance. Although a much thicker cladding layer could be deposited, on the order of approximately 10 $\mu$m, such a thick coating either tends to crack due to stress or prohibitively takes a very long time, on the order of a day, to deposit. Equally important, in these devices, if one attempted to attach a fiber pigtail connector, such as an array of fibers using silicon v-grooves, in order to make them practical, an unstable situation results because connection could only be made to the silicon substrate and the thin cladding layer, thus, leaving the upper portion of the fiber pigtail connector hanging and prone to misalignment.

SUMMARY OF THE INVENTION

This invention is a new optical packaging and interconnection technology which is particularly effective in not only addressing the problem of attaching fiber pigtails to glass waveguide silicon devices, but also in isolating these waveguide devices from the deleterious effects of their external environment. An important aspect of the invention lies in the novel realization that the foregoing objectives may be achieved by covering the device with a thin silica coverplate affixed with a low index epoxy, which extends the cladding layer of the waveguides such that the evanescent field does not interact with the environment. Moreover, the silica coverplate serves to "ruggedize" the device while providing end surfaces of sufficient area to which pigtailed fiber connectors can be attached.

In a specific embodiment of the invention, an integrated 19×19 star coupler formed on a silicon substrate is covered with a silica coverplate attached by means of a low index epoxy. The coverplate both isolates the waveguides, which are approximately a few microns below the surface, from their surrounding and moreover, provides an enhanced means for attaching fiber connectors thereto.

BRIEF DESCRIPTION OF THE DRAWING

A more complete understanding of the invention may be obtained by reading the following description in conjunction with the appended drawing in which.

DETAILED DESCRIPTION

The present invention is based upon the discovery that by covering glass waveguide silicon devices with a thin silica ($SiO_2$) coverplate affixed with a low index epoxy, it is possible to isolate these devices from external effects and at the same time provide an enhanced means for attaching fiber connectors thereto. The expression "low index epoxy" as used herein means an epoxy resin the index of refraction of which is lower than the index of refraction of the waveguide core of the device, equal or lower then the index of refraction of the cladding layer surrounding the waveguide core of the device or both. Importantly, the low index epoxy forms an extended cladding layer which provides enhanced optical confinement in the waveguide core. Moreover, the silica coverplate which is held by the epoxy serves to "ruggedize" the device and provide end surfaces to which pigtailed fiber connectors can be attached.

Figure 1:
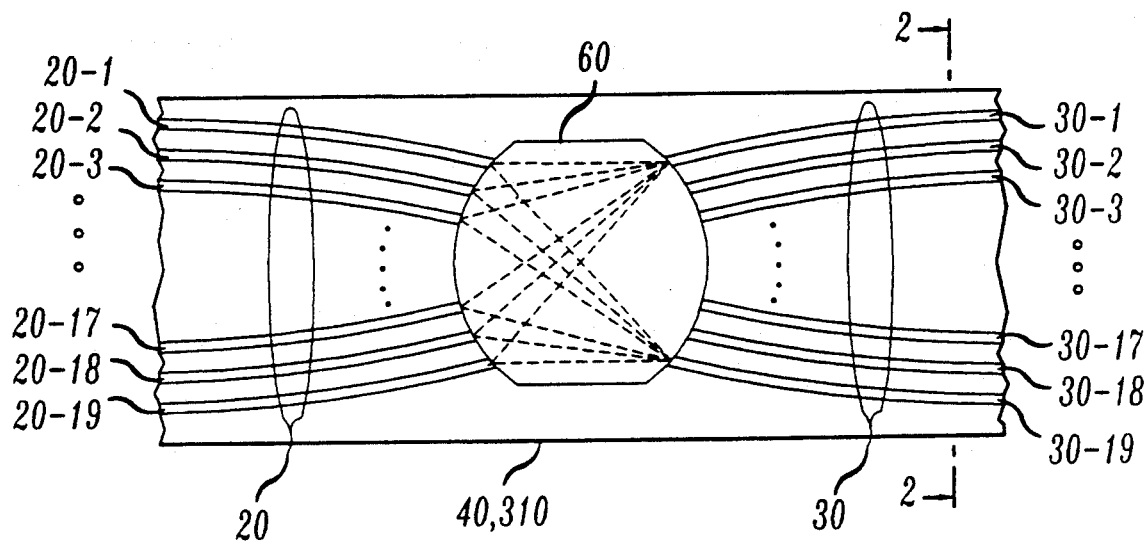
FIG. 1 is a planar view of a 19×19 star coupler utilizing the principles of the present invention.

One exemplary embodiment of an optical device according to the principles of the invention is depicted in FIG. 1. While the proceeding description relates to the depicted star coupler, which is fabricated using the prior art silica on silicon technology, it should be understood that other silica on silicon waveguide devices may be used, such as Bragg reflectors, multiplexers, splitters and the like, which are well known in the art. Furthermore, it is contemplated that these optical devices may be fabricated directly on fused quartz, silica, lithium niobate and the like. Accordingly, it should be understood that the integrated optical device shown in FIG.

1 is only for the purpose of illustration and not for the purpose of limitation.

Thus, without any loss of generality or applicability for the principles of the present invention, shown in FIG. 1 is a planar view for the geometry of an integrated 19×19 star coupler 10, consisting of two symmetric arrays of channel waveguides 20, 30 separated by a dielectric slab waveguide 60, each formed on silicon (Si) substrate 40. Conventional well known fabrication techniques, such as lithography, etching, low pressure vapor chemical deposition, flame hydrolysis and the like, may be used to fabricate star coupler 10. For a detailed discussion of glass waveguides on silicon and the processing therein, see C. H. Henry et al., *Journal of Lightwave Technology*, Vol. 7, No. 10 pp. 1530-9 (1989) and B. H. Verbeek et al., *Journal Of Lightwave Technology*, Vol., 6, No. 6 pp. 1011-15 (1988).

Figure 2:
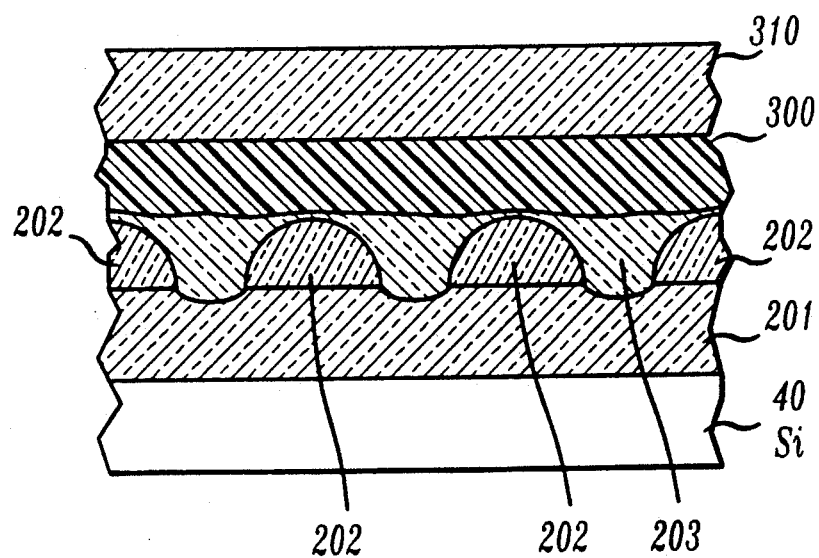
FIG. 2 is a cross-sectional view of the present star coupler.

It should be noted that the power from any one of input waveguides 20-1 through 20-19 is radiated into dielectric slab waveguide 60 and then received by each of the output waveguides 30-1 through 30-19. Efficient transfer of light across dielectric slab 60 is due to the mutual coupling of the convergent waveguides to their neighbors which improves the shape of the far field distribution. For a detailed description of the underlying operation of the above star coupler, see U.S. Pat. No. 4,904,042 issued to C. Dragone, which is incorporated herein by reference. A cross sectional view of star coupler 10 along the convergent region of several waveguides is illustrated in FIG. 2. Although the initial spacing of the waveguides is 200 μm, at the convergent region, the final spacing is tapered to approximately 8 μm, allowing sufficient mutual coupling for the efficient transfer of light between input array 20 and output array 30. With cladding layer 203 itself only about 4 μm, the fields from the waveguides extend beyond the confines of the top surface. More importantly the thickness of the cladding, is insufficient to provide a suitable area of contact for attaching an array of fiber pigtails. Hence, in accordance with the principles of the invention, silica coverplate 310 has been affixed on top of cladding layer 203 with a low index epoxy to obviate the foregoing problems. With silica coverplate 310 held in place by the epoxy, end surfaces are afforded to which pigtailed fiber connectors can be attached.

As shown in FIG. 2, waveguides 20-1 through 20-19 through 30-19 comprise a 10 μm thick $SiO_2$ base layer 201 formed by oxidizing the surface of silicon substrate 40 in a high pressure steam. Both core and cladding layers 202 and 203, respectively, were deposited using low pressure chemical vapor depositions. More specifically, a 2 μm thick phosphosilicate glass (8% weight Phosphorus), deposited using silane, oxygen and phosphine, was used as core layers 202, with 5 μm wide mesas subsequently etched by reactive ion etching after photolithographically defining core 202. Next, the core layers, were annealed at 1000° C. in $N_2$ in order to reflow the material. Further, a 3 μm thick top or cladding layer 203 of $SiO_2$ (4% weight Phosphorus) was deposited at 730° C. using tetraethylorthosilicate (TEOS), oxygen and phosphine. The resulting refractive index difference between core layers 202 and cladding layer 203 was estimated to be $7.3 \times 10^{-3}$ for a wavelength λ of 1.5 μm, with the cladding layer having a refractive index of approximately 1.456. The choice in the value of the refractive index difference between the core and cladding layers is predicated upon factors such as wavelength of operation, desired numerical aperture, and the desired number of modes, as well as other factors.

In accordance with the principles of the invention, by affixing silica coverplate 310 on top of cladding layer 203, it is possible to protect the star coupler from external effects as well as enhance the interconnection of external devices thereto. In an exemplary embodiment, silica coverplate 310 was fused silica having an index of refraction n of approximately 1.456. As illustrated in FIG. 2, low refractive index epoxy 300 is interposed between silica coverplate 310 and the waveguides in order not to extract energy from cores 202 thereof. That is, optical epoxy 300 cannot have a higher index of refraction than that of silica cladding layer 203. Those skilled in the art will readily note that it should be possible to eliminate cladding layer 203 and entirely replace it with epoxy 300.

In particular, a two component heat curing epoxy having an index of refraction $n_{exp}$ of 1.4071 was utilized, such as the epoxy sold by Epoxy Technology, Inc., Billerica, Mass., designated by its tradename EPO-TEX 328. This epoxy has a medium viscosity of 3500 cps as well as good wetting characteristics and transparent properties. The epoxy was applied by wicking it between cladding layer 203 and silica coverplate 310, thereby resulting in the configuration shown in FIG. 2. Subsequently, the epoxy was cured at 150° C. leaving a thin epoxy layer of about 10 μm which adheres silica coverplate 310 to the top surface of the waveguides. It should be noted that some care must be taken in applying the epoxy so as to remove all air bubbles therein between silica coverplate 310 and the top surface of cladding layer 203. With the dimensions of the star coupler being 1.5×3.0 cm and 0.55 mm thick, silica coverplate 310 was cut to the same dimensions and, then, the ends thereof polished. Coverplate 310 had approximately a thickness of 0.65 mm.

It should be noted that with silica coverplate 310 affixing to the cladding layer, a relatively large surface area now exists at both input and output ends of the present coupler to which firm attachment of pigtail fiber array connectors can be made. For a detailed description of pigtail array connectors see, for example, U.S. Pat. No. 4,639,074 issued E. J. Murphy, which is incorporated herein by reference. Note that, previously in the prior art, if one attempted to attach a connector by butt coupling, an unstable situation resulted since attachment could only be made to the silicon substrate and the thin cladding layer, leaving the upper portion of the connector prone to misalignment.

Figure 3:
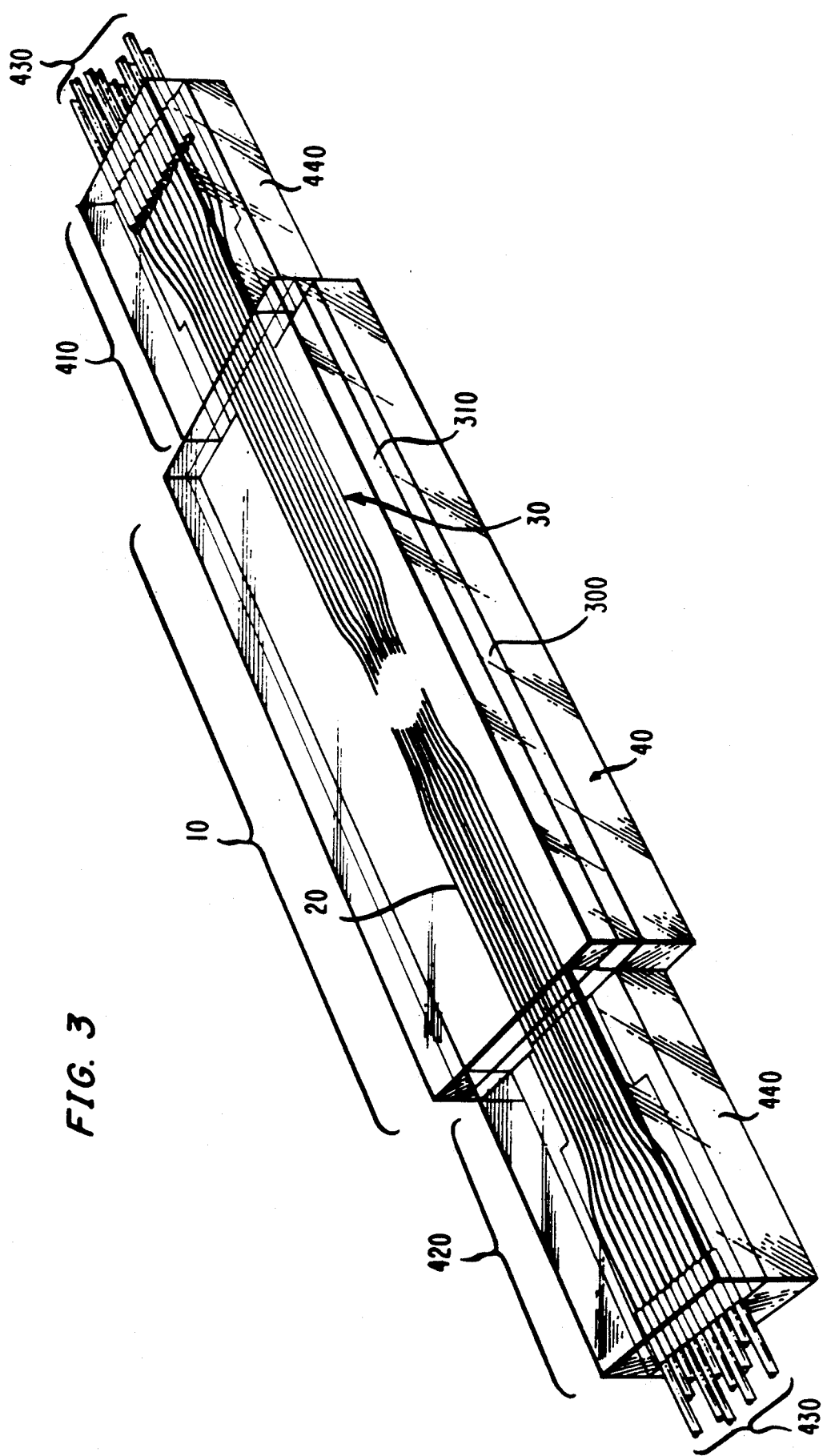
FIG. 3 is an isometric view of the present star coupler with fiber connectors attached thereto.

Several measurements from experimental practice were made before and after covering the device with coverplate 310 by butt coupling fiber pigtail connectors 420 and 410 to arrays of channel waveguides 20 and 30, respectively, as shown in FIG. 3. In this particular embodiment, fiber pigtail connectors 420 and 410, each comprised a linear array of fibers positioned within v-grooves fabricated on the top surface of silicon chips 440. Such fiber pigtail connectors are well known in the art and not discussed here. However, for a detailed discussion of these optical connectors, see for example, the patent of E. J. Murphy cited aboveherein.

Figure 4:
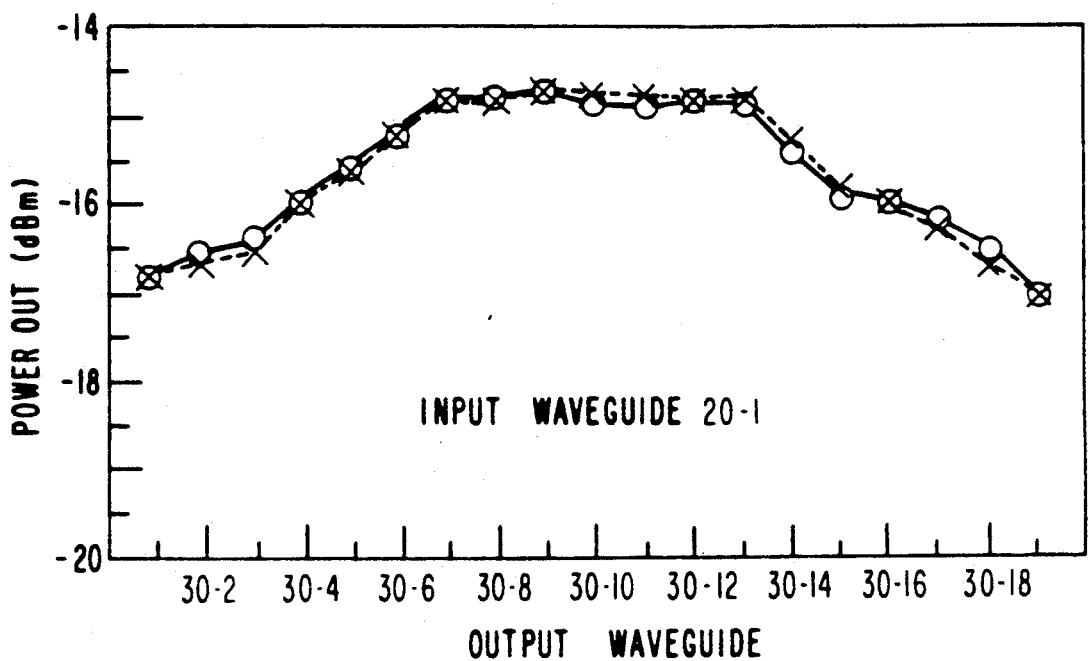
FIGS. 4 through 6 are the coupling characteristics of the present star coupler for horizontally polarized light.
Figure 5:
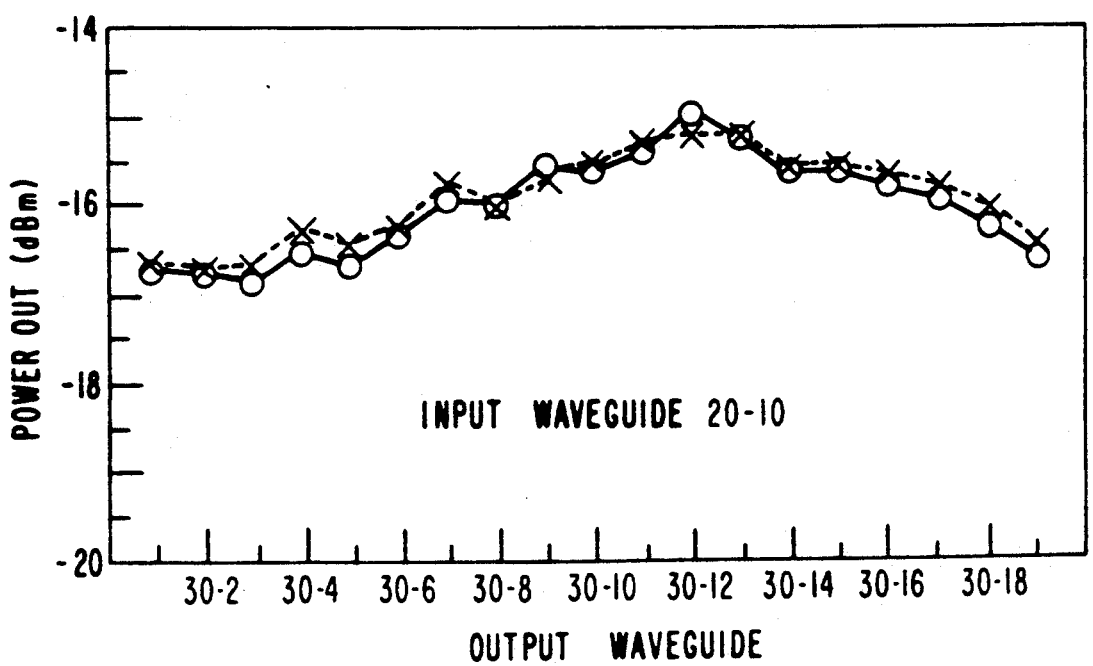
Figure 6:
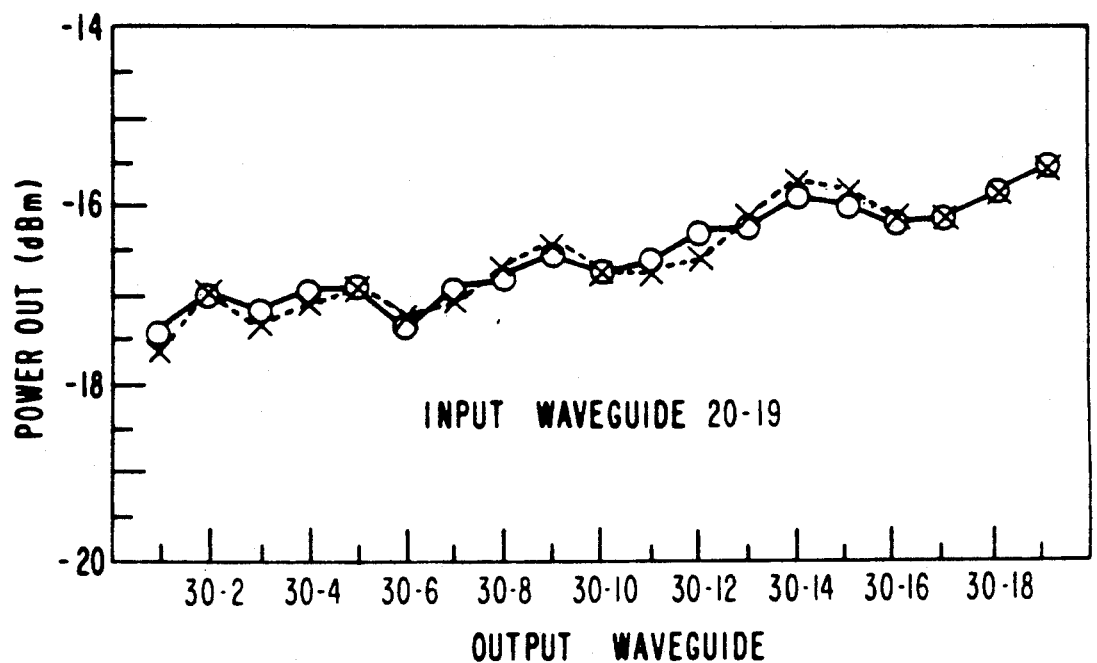

Specifically, measurements were made for the coupling efficiencies between input waveguides 20-1, 20-10 and 20-19 and output waveguides 30-1 through 30-19. That is, the power on each output waveguide was measured with optical power injected separately into input waveguides 20-1, 20-10 and 20-19. Since the waveguides exhibit some polarization sensitivity, measurements were made for both horizontal and vertical polarization orientations. FIGS. 4 through 6 show the performance of star coupler 10 before and after covering the waveguides with silica coverplate 310, and with input waveguides 20-1, 20-10 and 20-19 each separately excited with horizontally polarized light having a wavelength of approximately 1.3 μm. It should be noted that measurements made before affixing silica coverplate 310 are designated by open circles whereas measurements made after affixing the silica coverplate 310 are designated by crosses.

Figure 7:
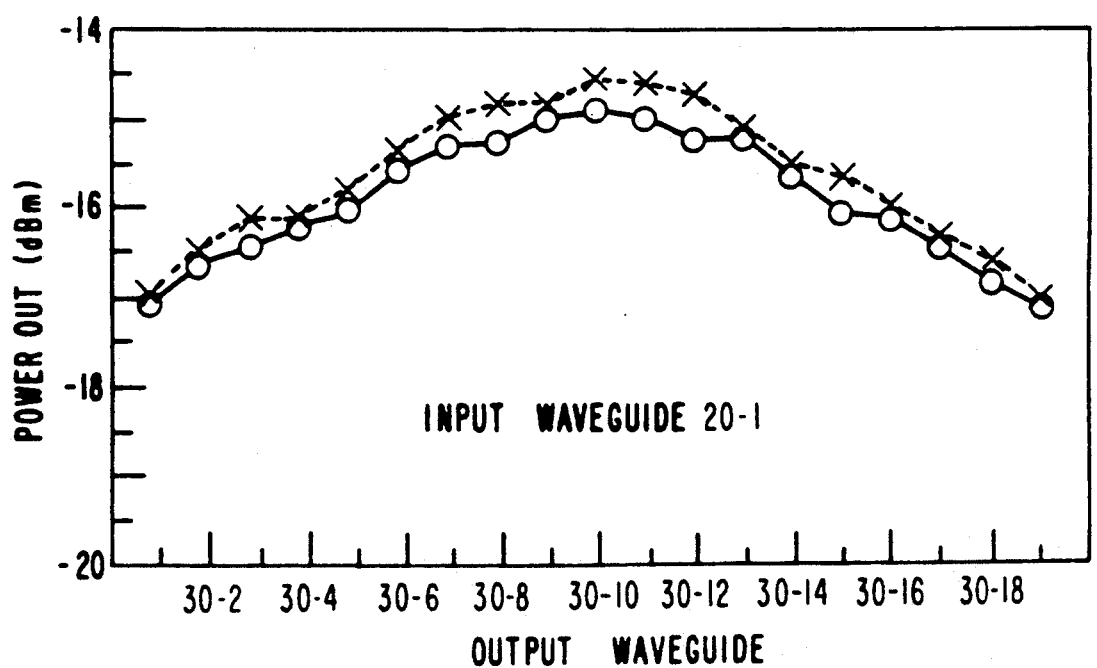
FIGS. 7 through 9 are the coupling characteristics of the present star coupler for vertically polarized light.
Figure 8:
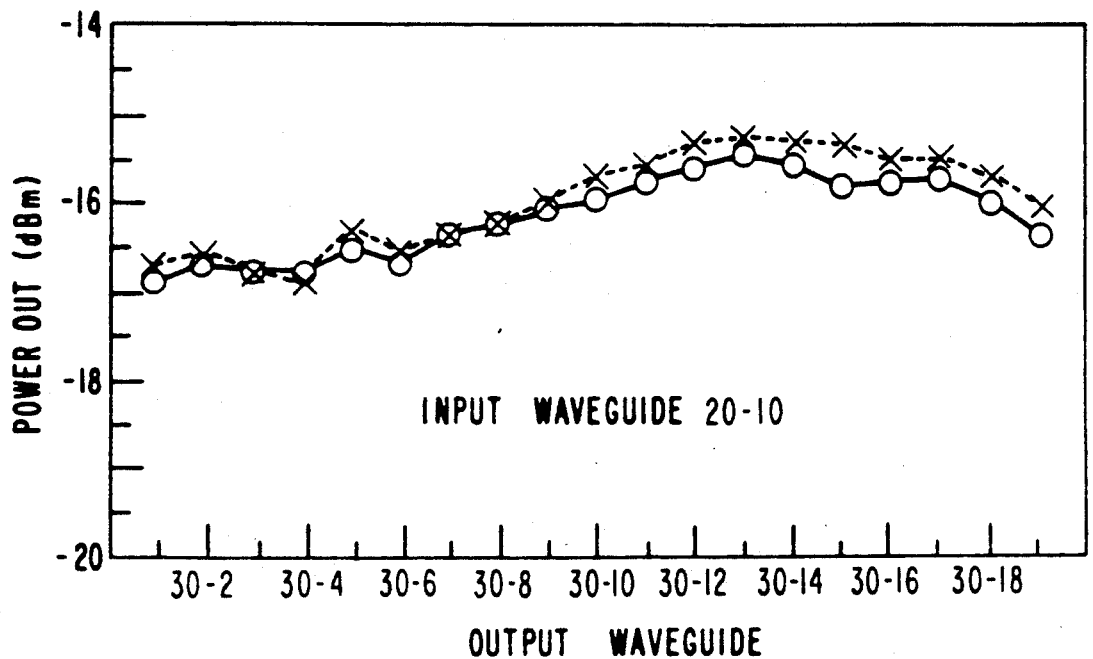
Figure 9:
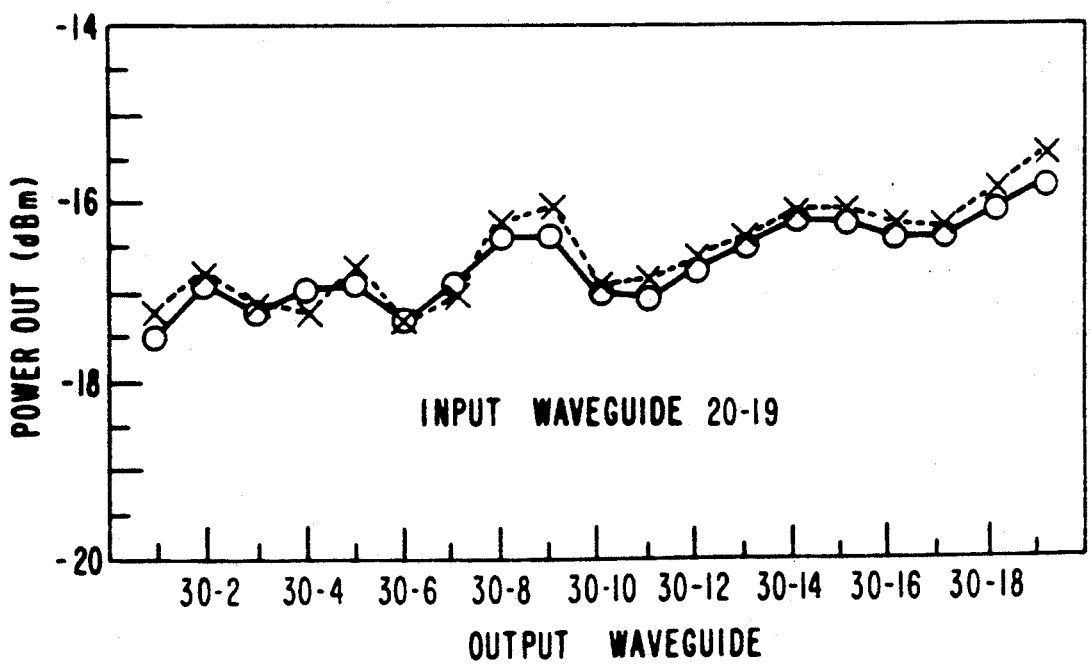

In theory the splitting loss of the star coupler 10, which is proportional to 1/N (where N the number of input or output waveguides), should in this case be approximately 12.8 dB. Further, from FIGS. 4 through 6, it should be noted that the loss before and after affixing silica coverplate 310 is substantially identical. It is believed that the coupling loss between the central input waveguide 50-10 and the output waveguides, which is about 2 dB more than the ideal coupler, can be accounted for by the inherent transmission loss within the waveguides and the coupling loss between the input and output waveguides and fiber connectors 420 and 410, respectively. Similarly, FIGS. 7 through 9 show the coupling loss for vertically polarized light. Here, it is noted that there is slight increase in coupling efficiency of approximately less than 0.5 dB, which is believed to be caused by the improved coupling between the input and output waveguides because of the replacement of air in dielectric slab waveguide 10 with low index epoxy 300. Various other star couplers that utilized the principles of invention were fabricated with similar experimental results. Furthermore, various measurements were made after temperature cycling the devices up to a temperature of 100° C., with no degradation in performance.

Various other modifications may be made by those skilled in the art which will embody the principles of the invention and fall within the spirit and scope thereof. For instance, it is contemplated that other suitable material may be used for the core, such as silicon nitride, $Si_3N_4$, which may be deposited on the silicon substrate by low pressure chemical vapor deposition from dichlorosilane, ammonia and oxygen. Additionally, while in the exemplary embodiment abovehere in, the cladding layer comprising $SiO_2$ was deposited from tetraethylorthosilicate and oxygen, it is contemplated that the $SiO_2$ may also be deposited from dichlorosilane, ammonia and oxygen as well as silane and oxygen. In either case, however, the refractive index of $SiO_2$ can be controlled by the addition of phosphorus, such as from a phosphine source.

I claim:

1. An optical component comprising:
   an optical device, said optical device including at least one waveguide formed on a substrate, said at least one waveguide including a core and a cladding layers, the cladding layer having a refractive index lower than the refractive index of the core layer;
   a protective coverplate disposed over said waveguide; and
   a layer of epoxy interposed between said coverplate and said at least one waveguide, said epoxy having a refractive index which is equal to or less than the refractive index of the cladding layer and being of sufficient thickness for extending the cladding layer of said waveguide to a thickness such that optical radiation propagating in said at least one waveguide is confined below said coverplate.

2. The optical component as defined in claim 1 wherein said substrate is a semiconductor.

3. The optical component as defined in claim 2 wherein said semiconductor comprises silicon.

4. The optical component as defined in claim 2 wherein said coverplate comprises silica.

5. The optical component as defined in claim 4 wherein the core layer of said waveguide comprises doped silica.

6. The optical component as defined in claim 5 wherein the cladding layer of said waveguide comprises doped silica.

7. The optical component as defined in claim 4 wherein the core layer of said waveguide comprises silicon nitride.

8. The optical component as defined in claim 1 wherein said substrate comprises silica.

9. The optical component as defined in claim 1, wherein said optical device is an integrated optical star coupler.

10. An optical component comprising:
    an optical device, said optical device including a waveguide core layer formed on a semiconductor substrate;
    a coverplate disposed over said waveguide core layer; and
    a layer of low index epoxy interposed between said coverplate and said waveguide core layer for forming a waveguide cladding layer, the refractive index of said low index epoxy being lower than the refractive index of the material of the core layer, and said low index epoxy layer being sufficiently thick such that optical radiation propagating in said waveguide core layer is confined below said coverplate.

11. A method of packaging an optical device, said optical device comprising a waveguide formed on a substrate and a coverplate disposed over said waveguide, said method comprising the steps of:
    interposing between said waveguide and said coverplate a layer of low index epoxy of a thickness such that optical radiation propagation in said waveguide is confined below said coverplate.

12. A method of attaching an optical fiber connector to an optical device, said optical device including a waveguide formed on a substrate, said method comprising the steps of:
    disposing over said waveguide a coverplate;
    interposing between said waveguide and said coverplate a layer of a low index epoxy, the index of refraction and the thickness of the epoxy layer being such that optical radiation propagating in said waveguide is confined below said coverplate; and
    butt coupling and attaching said optical fiber connector to said waveguide.

* * * * *